April 22, 1958     L. A. CUNDALL     2,831,684
CUT-SHEET STACKING AND TAKE-AWAY MECHANISM
Filed May 31, 1955     7 Sheets-Sheet 1

Fig.1

Lincoln A. Cundall
INVENTOR.

BY Daniel S. Magne
ATTORNEYS

April 22, 1958 L. A. CUNDALL 2,831,684
CUT-SHEET STACKING AND TAKE-AWAY MECHANISM
Filed May 31, 1955 7 Sheets-Sheet 2

Lincoln A. Cundall
INVENTOR.

BY Daniel L. Mayne
ATTORNEYS

April 22, 1958 L. A. CUNDALL 2,831,684
CUT-SHEET STACKING AND TAKE-AWAY MECHANISM
Filed May 31, 1955 7 Sheets-Sheet 3

Lincoln A. Cundall
INVENTOR.
BY Daniel J. Mayne
ATTORNEYS

April 22, 1958  L. A. CUNDALL  2,831,684
CUT-SHEET STACKING AND TAKE-AWAY MECHANISM
Filed May 31, 1955  7 Sheets-Sheet 4

Lincoln A. Cundall
INVENTOR.

BY Daniel J. Mayne

ATTORNEYS

April 22, 1958  L. A. CUNDALL  2,831,684
CUT-SHEET STACKING AND TAKE-AWAY MECHANISM
Filed May 31, 1955  7 Sheets-Sheet 5

Lincoln A. Cundall
INVENTOR.

April 22, 1958  L. A. CUNDALL  2,831,684
CUT-SHEET STACKING AND TAKE-AWAY MECHANISM
Filed May 31, 1955  7 Sheets-Sheet 6

Lincoln A. Cundall
INVENTOR.

BY
ATTORNEYS

United States Patent Office 2,831,684
Patented Apr. 22, 1958

2,831,684

CUT-SHEET STACKING AND TAKE-AWAY MECHANISM

Lincoln A. Cundall, Rochester, N. Y., assignor to Eastman Kodak Company, Rochester, N. Y., a corporation of New Jersey Application May 31, 1955, Serial No. 512,267

6 Claims. (Cl. 271—71)

The present invention relates to an improved cut-sheet stacking and take-away mechanism for use on a web slitting and chopping machine.

This application is a continuation-in-part of my application Serial No. 456,228, filed September 15, 1954, entitled "Cut-Sheet Stacking and Take-Away Mechanism."

In the photographic art it is common practice to make and coat photographic papers in long, wide webs and to then slit and chop these webs into sheets of desired sizes for shipment to the trade. These sheets as they are chopped must be stacked and counted out so that a given number of sheets can be packed in each box.

The object of the present invention is to provide a mechanism which will stack the sheets as they leave the chopper and after counting a given number of stacked sheets, will deliver them in stacked relation to a packing point where they can be placed in a box. This stacker and take-away mechanism is so designed that it can be readily combined with conventional web slitting and chopping machines so as to work automatically in synchronism therewith.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing in which:

Generally speaking, the sheet-stacking mechanism comprises one or more pairs of grippers, depending upon the width of the web being slit and chopped into sheets, which are oscillatory moved between a sheet-receiving position directly below the chopper and a sheet-stacking position remote from the chopper by means of a rack and pinion drive operating in synchronism with the chopper or intermittent web feeding mechanism which advances the web to the chopper. Each pair of grippers includes a pair of relatively movable jaws which are normally spring pressed together to grip the leading edge of the sheets as it comes from the chopper. These jaws are held open by a cam-operated mechanism until the grippers reach their sheet-receiving position whereupon they are spring closed upon the edge of the sheet just before the gripper starts to move to its stacking position. In moving to the stacking position the grippers move the sheet into a substantially horizontal position and when they reach their stacking position the cam mechanism opens the grippers to deposit the sheet in an upwardly inclined receptacle.

The take-away mechanism transfers the cut and counted sheets from the receptacle to a take-away belt from which the operator removes and wraps the stack of sheets for shipment. It includes a stack pusher having two arms extending upwardly through slots in the bottom of the receptacle to engage the rear edge of a stack of sheets. Means are provided for moving the pusher upwardly along the bottom of the receptacle and during which movement the arms engage the rear of the stack and push it up and onto a continuously moving take-away belt. The means for moving the stack pusher comprises a continuously driven chain engaged by a sprocket rotatably mounted on the pusher and springs or weights for returning the pusher to its lower position. When a counter mechanism has counted a predetermined number of sheets going to the stack, a circuit is completed to energize a solenoid which in turn unlocks a pawl which drops into engagement with a ratchet on the sprocket and locks the ratchet and sprocket against rotation. At this itme the chain carries the pusher upwardly to deposit the stack on the take-away belt. When the pusher reaches its uppermost position, the pawl engages a stop to disengage it from the ratchet and the pusher returns to its starting position under the action of the springs or weights. In order to handle those sheets deposited while the pusher is moving upwardly or is in its upper position, the pusher has a pair of tail pieces extending rearwardly onto which the sheets drop. When the pusher returns to its starting position, those sheets which have collected on the tail pieces are held against movement by a fixed wall through slots in which the tail pieces pass and the tail pieces and pusher arms move out from under the sheets allowing them to drop into the receptacle ahead of the pusher arms.

Figure 1:
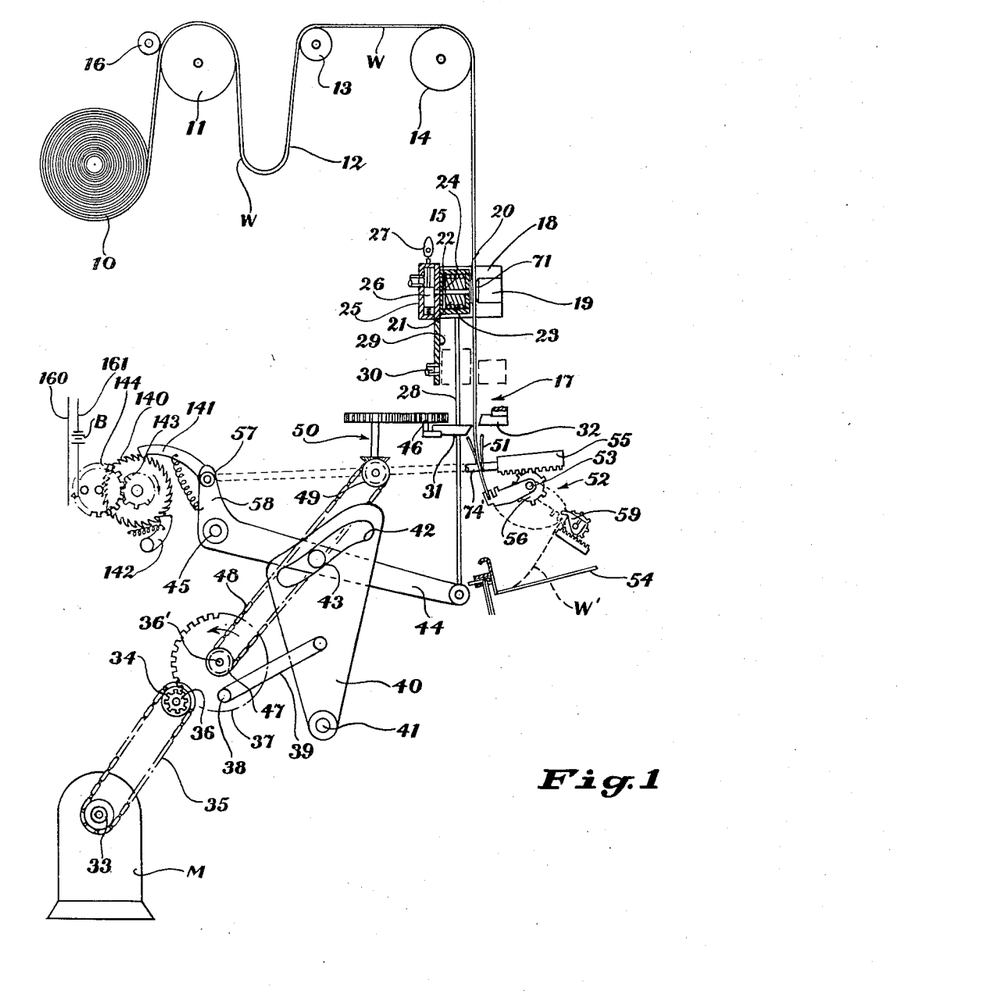
Fig. 1 is a diagrammatic view showing a sheet stacking mechanism constructed in accordance with one embodiment of the present invention combined with a conventional web chopping machine.

Referring now to Fig. 1, a conventional web slitter and chopper is schematically shown as comprising a supply roll 10 of paper, or other web material W, from which the web is led over a feed roll 11 into a free loop 12 and thence over a pair of guide rolls 13 and 14 to an intermittent pull-down mechanism, indicated generally at 15. If the web W is a wide one, it may be slit into several webs by slitting rolls 16 before entering the free loop section. In the event the web is slit lengthwise into narrow webs, it will be appreciated that there will be a separate series of guide rolls 13 and 14 and a separate pull-down mechanism and chopper for each web so slit. However, since each web so slit will be handled by the same type of chopping, stacking and take-away mechanism, although independently operated, only one set of mechanisms is shown and will be described, it being understood that each one will be a duplication of the other.

The intermittent pull-down mechanism 15 feeds a given length of web past the chopping station 17 which operates in synchronism with the pull-down mechanism to chop the web into sheets of a given length as determined by the length of web fed by the pull-down mechanism. While any suitable form of pull-down mechanism may be used, for purposes of illustration I have shown that well-known form which consists of a block 18 on which a stationary gripper 19 is mounted on one side of the web and an air-operated gripper 20 is mounted on the other side of the web. This air-operated gripper 20 is normally retracted to an inoperative position by a spring 21 during the upward stroke of the block and when it reaches the top of the stroke a port 22 in the chamber 23 housing the piston portion 24 of the gripper lines up with a port in the valve chamber 25. When the valve 26 is opened by cam 27 at the time the gripper reaches the top of its stroke, air is introduced into the chamber 23 to move the gripper 20 to a web gripping position. As the gripper is pulled downwardly by a rod 28 the port 22 in the gripper chamber 23 is held closed by virtue of a sliding engagement with wall 29 until the chamber reaches its lower position at which time the port 22 exhausts through a port 30 in the wall. The lower position of the grippers is shown in dotted lines in Fig. 1.

At the end of the pull-down stroke, a sheet W' is chopped from the web by a movable shear blade 31 which cooperates with a stationary shear 32. For operating the pull-down mechanism and the shearing blades in synchronism, the following structure may be provided. The prime mover is a reduction gear motor M having a driving sprocket 33 connected to a driven sprocket 34 by a chain 35. Driven sprocket 34 is fixed to the shaft which carries a pinion 36 driving gear 37 mounted on shaft 36'. Eccentrically mounted on gear 37 is a crank 38 connected by a crank arm 39 to a sector 40 oscillatably mounted on shaft 41. This sector is provided with a cam slot 42 engaged by pin 43 carried by lever 44 pivoted on shaft 45. Thus, as the sector is oscillated by the crank arm 39, the grippers of the pull-down mechanism are raised and lowered by the rod 28 fastened to the end of lever 44. At the same time the movable shear blade 31 is driven by a gear and crank connection 46 which is in turn driven from shaft 36' by a sprocket 47, chain 48, sprocket 49 and a gear combination 50 including two bevel gears and a spur gear engaging the gear of the gear and crank combination. The drives for these parts are so related that the shear blades are opened during the downward travel of the web and chops the web at the end of the pull-down stroke.

Coming now to the present invention, beyond the shear blades 31 and 32 there is a guideway 51 into which the leading end of the web is directed. The sheet gripper, indicated generally at 52, is oscillatably mounted on a shaft 53 to move between a sheet-receiving position, solid line position in Fig. 1, below the guideway 51 and a sheet-depositing position, see dotted line position. The sheet gripper 52 grips the leading edge of the web as it reaches the end of the pull-down stroke and holds it during movement of the chopped sheet to the depositing position at which time it releases the sheet and deposits it in a receptacle 54 in stacked relation to other sheets previously deposited therein. This sheet gripper is oscillatably moved in synchronism with the web feeding and chopping mechanisms by virtue of a rack and pinion drive 55 and 56, respectively, the rack being oscillated by being connected at point 57 to an arm 58 on lever 44. By virtue of this mechanism it will be seen that just as the web W reaches the end of its pull-down stroke, the sheet gripper 52 approaches the guideway 51 to receive the leading edge thereof. Then after the sheet is cut from the web, the gripper grips the sheet and swings to the dotted line position where the cut sheet is released in a substantially horizontal position and is allowed to fall into the receptacle 54. Rather than rely upon gravity to cause the sheet to fall out of the sheet gripper at the ends of its stroke, I may provide an oscillatable knock-out arm 59 which is adapted to strike the edge of the sheet and knock it out of the gripper.

Figure 2:
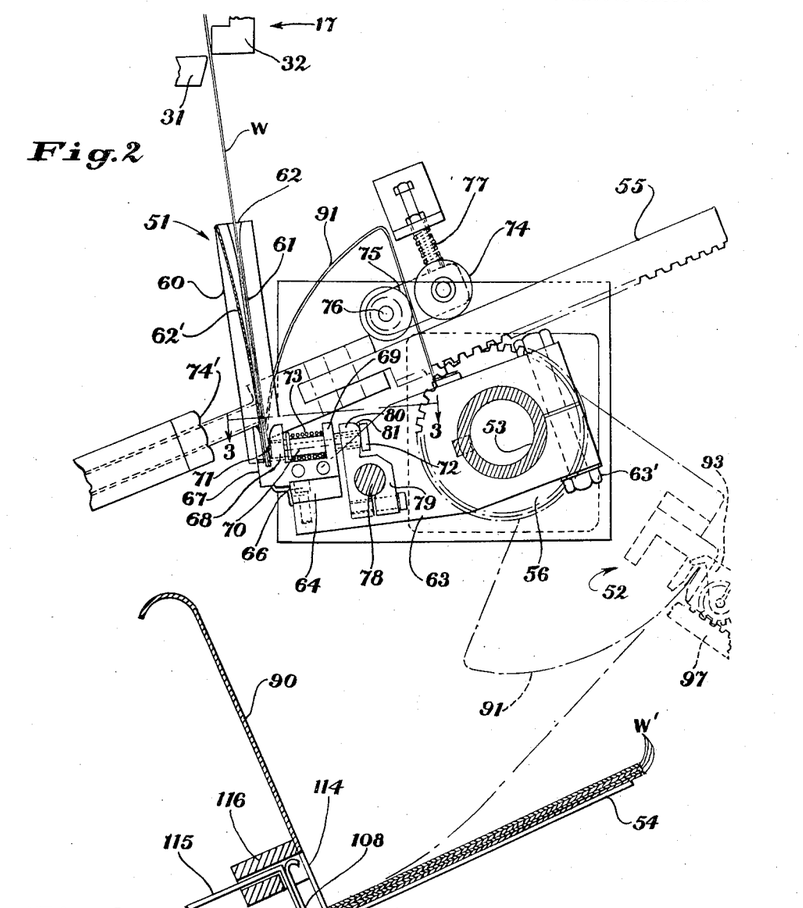
Fig. 2 is a side view of a sheet stacking mechanism constructed in accordance with a preferred embodiment of the present invention, and showing the sheet gripper in its sheet-engaging position.
Figure 3:
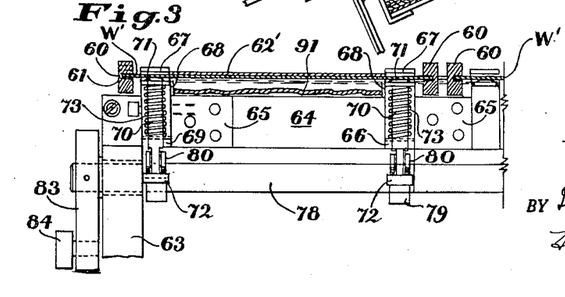
Fig. 3 is a sectional view of the sheet gripper taken substantially on line 3—3 of Fig. 2.
Figures 4, 5:
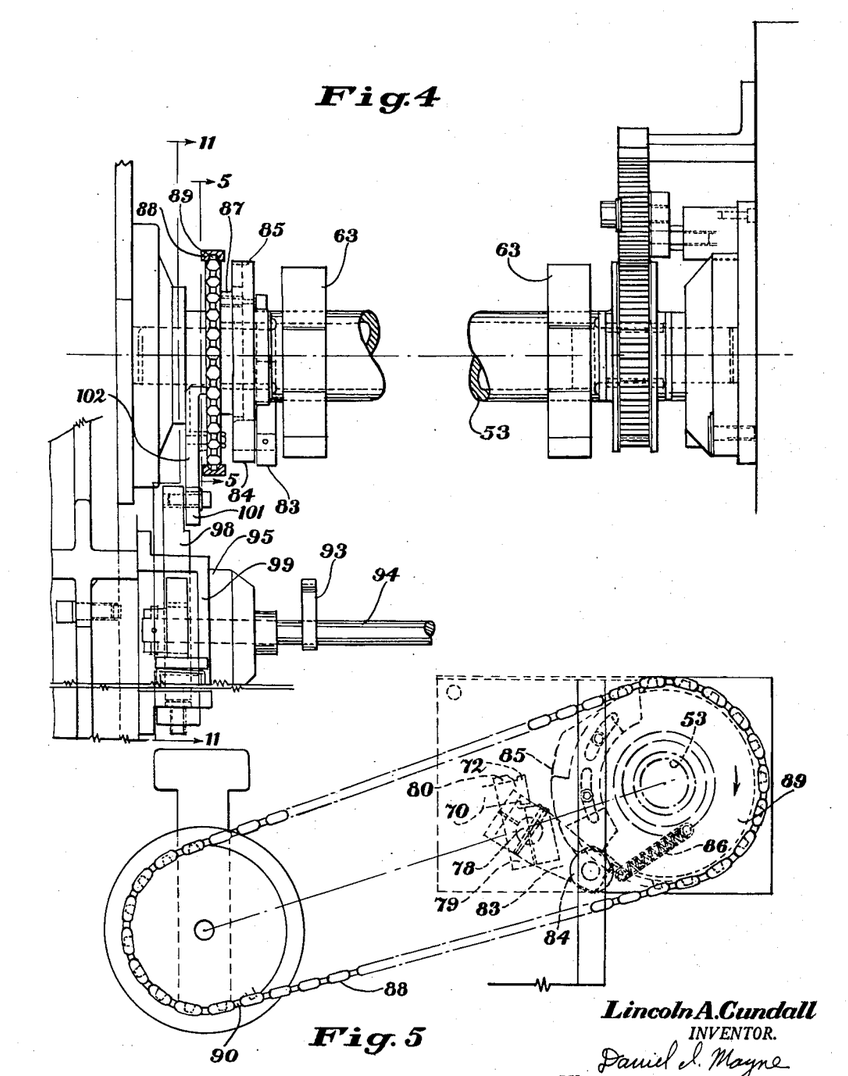
Fig. 4 is a rear elevational view showing the driving mechanism for the sheet gripping and stacking means.
Fig. 5 is a side view taken substantially on line 5—5 of Fig. 4 and showing the cam mechanism for opening the sheet gripping jaws and allowing said jaws to close at the proper time.

Referring now to Figs. 2–4, the sheet stacking mechanism constituting a part of the present invention will be described in more detail. As shown in Figs. 2 and 3, the guideway 51 which receives the leading end of the web W as it passes beyond the chopping station 17 comprises a pair of fixed channel members 60, each provided with a groove 61, into which the edges of the web are adapted to extend, as shown in Fig. 3, and which are adapted to direct and hold the end of the web flat in a given plane and guide it to the sheet grippers. As shown at 62 in Fig. 1, the upper end of the grooves 61 are flared outwardly to help guide the end of the web into position. If wide sheets are being handled, it may be necessary to provide a guide surface 62' between said members 60 in order to support the middle of the sheet and prevent it from buckling and falling out of the grooves 61. In Fig. 3 I have shown one-half of a second pair of guide channels 60 adjacent the complete pair in order to show how a web which is slit into more than one strip might be handled along with another web.

The sheet-gripping means 52 for each sheet or web comprises a pair of arms 63 fastened to the shaft 53 by clamping bolts 63' so that their position circumferentially of the shaft can be readily adjusted in order to bring the grippers in proper close relation with the lower end of the guideway 51 when moved to a sheet-receiving position. Fixed to the free end of these two arms and extending parallel to the shaft is a supporting bar 64 on which are bolted supporting blocks 65. Fixed to each of these blocks 65 by bolts 66 is a sheet gripper consisting of two stationary jaws 67 and 68 adapted to align with the grooves 61 in the sheet guideway and form the bottom for said guideway when the gripping means is in sheet-receiving position, see Fig. 2. Slidably mounted in bores in the rearmost jaw 68 and an upright 69 spaced therefrom is a plunger 70 which terminates at one end in a rubber tip 71 within the jaw 68 and at the other end in an enlarged head 72. This plunger is normally moved to a sheet-gripping position by coil spring 73 and in which position the end of the web is clamped between the stationary jaw 67 and the rubber tip 71 on the plunger. There are two of these gripping jaws for each web and they are so spaced transversely of the web as to engage the same close to the edges thereof.

As pointed out above, the shaft 53 is oscillated between the two positions shown in Figs. 1 and 2 by virtue of the reciprocating rack 55 engaging the pinion 56 fixed to the shaft. The rack is held in engagement with the gear 56 by a roller 74 carried on the end of an arm 75 pivoted on shaft 76, said roller engaging the back of a rack and being spring urged toward the same by spring 77. A connecting rod 74' connects this rack to pivot point 57 on arm 58 of lever 44, see Fig. 1. It should be pointed out that if the web being handled is so wide as to have been slit into more than one web for chopping into sheets, then each web will have a separate sheet-gripping mechanism. So that each one of such gripping mechanisms can be operated independently of the other while being mounted on a single shaft in side-by-side relation, the shafts 53 for carrying the individual grippers are made tubular and the separate tubular shafts for each pair of grippers would then be rotatably mounted on a single shaft for individual oscillation.

When the grippers are moved to a sheet-receiving position, the jaws must be opened to receive the end of the web fed through the guideway, but by the time the sheet is chopped from the web, the jaws must be closed to grip the end of the sheet and must remain closed while the gripping mechanism is moved to its sheet-depositing position. To attain this result, a shaft 78 is oscillatably mounted in the gripper arms 63 slightly below and to the rear of the gripping jaws and extends parallel to the shaft 53. An actuating arm 79 for the plunger of each gripper is clamped to this shaft, said arms 79 terminating in a yoke 80 embracing the end of the plunger and having rounded faces 81 engaging the enlarged head 72 on the end thereof. It will thus be seen that if the shaft 78 is rotated in a clockwise direction, see Fig. 2, the actuating arms will retract the plungers and open the grippers for receiving a sheet. On the other hand, if the shaft is rotated in a counterclockwise direction, the springs 73 will move the plungers to a sheet-gripping position. The opening and closing of the jaws at the proper time is accomplished through an arm 83 fixed to shaft 78 and having a roller cam follower 84 carried on the end thereof normally held in contact with a cam 85 by a spring 86. Cam 85 is rotatably mounted on the gudgeon 87 of shaft 53 and is continuously driven in a clockwise direction by a chain 88 engaging a sprocket 89 on the shaft gudgeon 87 and being driven by a driving sprocket 90 which is constantly driven by a prime mover, not shown, see Fig. 5. The relationship between an oscillating gripper drive and the cam driven gripper plungers is such that the end of the web is gripped during the dwell period in the upstroke (shown in full lines in Fig. 2), is held by the jaw while being carried to the sheet-releasing position (dotted line position in Fig. 2) and then released by opening of the jaws. As shown in Figs. 2 and 5, the grippers are in the sheet-receiving position and the roller 84 has just dropped off of the cam rise to allow the spring 73 to move the plunger 70 to sheet-gripping position. Since the shaft 78 is carried by gripper arms 63, the plunger operating arm 83 and roller 84 thereon will move in a counterclockwise direction while the grippers are moving to their sheet-releasing position. During this time the operating cam 85 is moving in a clockwise direction and the rise on the cam will again meet the follower roller 84 during the dwell period in the back position of the grippers and open the grippers to release the sheet. The cam 85 and follower roller 84 then travel in the same clockwise direction together and with the roller on the cam rise, thereby keeping the grippers open until they return to their sheet-receiving position. At this time the follower roller 84 again drops off the rise of cam 85 and the plunger 70 is allowed to move under the action of its spring 73 to again grip the next sheet or web end.

When the gripper mechanism reaches the sheet-releasing position, the sheet W' has been moved to a substantially horizontal position, see Fig. 2, above the receptacle 54 so that when the jaws open, the sheet will fall out of the jaws into said receptacle. To aid in stacking the sheets, the bottom of the receptacle is inclined upwardly so that the sheets will slide down against a back wall 90 and be evenly stacked thereby. As will be observed, the receptacle 54 has no front wall opposite back wall 90 because the stack of sheets is pushed out this side of the receptacle, as will be described hereinafter. In order to prevent relatively long and wide sheets from falling backward as the grippers pull them from the guideway 51, it has been found expedient to equip each pair of grippers with a curved sheet supporting apron 91, of the form best shown in Fig. 2, which extends between the grippers and moves therewith. This supporting apron will engage and support the center part of the sheet as the sheet is pulled from the guideway by the grippers and will insure the sheet being deposited flatwise in the receptacle 54.

Figure 11:
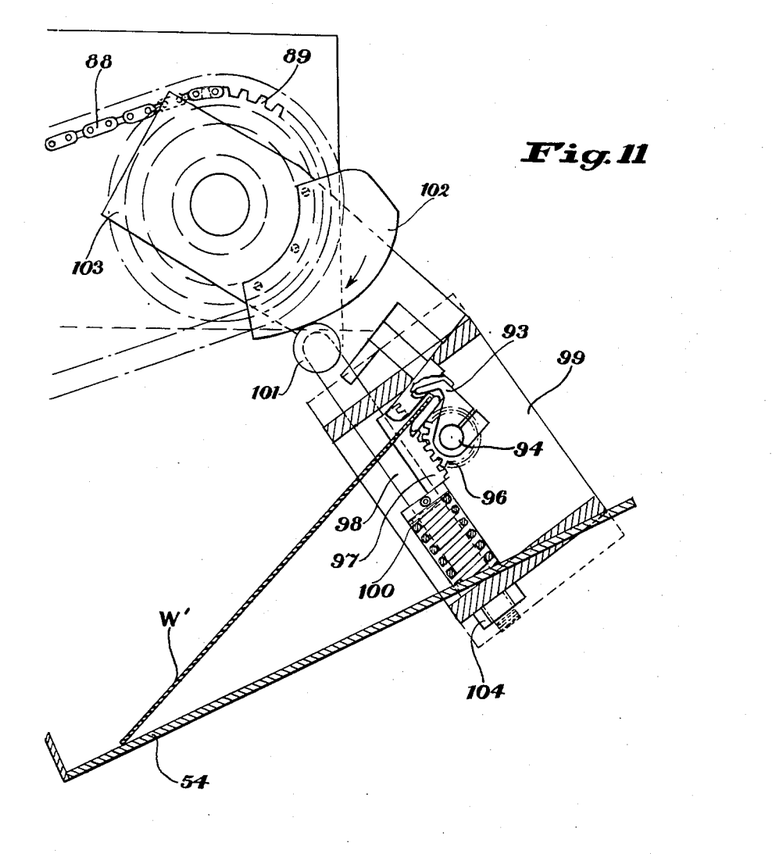
Fig. 11 is a side view taken substantially on line 11—11 of Fig. 4, and showing the knock-out mechanism which serves to positively knock the sheets from the jaws of the grippers when said grippers reach their sheet-stacking position.

It has been found that when the machine is stepped up to high-speed operation, i. e., handling about 100 sheets per minute, the dwell period of the gripping means at the sheet-releasing position might be so short that the sheet will not have sufficient time to fall out of the jaws before the grippers start back to their sheet-receiving position. This results in the sheet being buckled and may even result in its not falling in proper stacked relation with other sheets in the receptacle. To prevent this, I have devised a knock-out mechanism which is adapted to strike the gripped edge of the sheet just as the jaws of the grippers are opened and thereby knock the sheet out of the jaws. As shown in Fig. 11, this knock-out mechanism comprises one or more fingers 93 clamped to a shaft 94 oscillatably mounted in bearings 95 fixed to the frame of the machine below the bearings for shaft 53, see Fig. 4. This shaft 94 extends parallel to shaft 53 and is mounted below and to the rear thereof. There will preferably be two knock-out fingers 93 for each sheet, the fingers being spaced apart so as to engage the sheet adjacent and just inside of each gripper jaw. The shaft 94 is oscillated by means of a pinion 96 fixed thereto which is engaged by a rack 97 carried by a slide bar 98 slidably mounted in a bracket 99 fixed to the frame of the machine. This slide bar is normally urged by a coil spring 100 in a direction such as to move the roller 101 on the end thereof into the path of a cam 102 fixed to a plate 103 which is in turn mounted on the face of sprocket 89 so as to be rotated continuously therewith. When the cam roller 101 is engaged by the cam 102, the slide bar 98 is moved downwardly against spring 100 and the knock-out finger 93 is oscillated to a position to strike the edge of a sheet held by the grippers and to knock the sheet from the grippers. Since the cam 102 is mounted on the same constantly rotating part as is cam 85 which serves to open the gripper jaws, it can be seen that no difficulty will be encountered in adjusting this cam 102 so that the knock-out fingers will be operated just as the jaws of the grippers are opened. When the cam 102 passes beyond roller 101, the bar 98 moves upwardly under the action of the spring 100 to move the knock-out fingers to an inoperative position. In order to insure that the roller 101 on bar 98 will not fall in toward shaft 53 to an extent such that it will not move up onto the cam 102 in each successive rotation, the bar 98 has its end provided with threads onto which there is placed an adjustable stop nut 104 adapted to engage the bracket 99 and limit travel of the slide bar 98 in this direction.

The take-away mechanism constituting a part of the present invention serves to transfer the cut and counted sheets from the receptacle 54 to a take-up belt and from which an operator removes and wraps the stacks of sheets for shipment. As shown in Figs. 6–10, this take-away mechanism comprises a stack pusher 105 including a guide carriage 106 having two spaced guide tubes 107 slidably engaging two parallel, and upwardly inclined, stationary guide rods 107'. These rods lie below and extend parallel to the bottom of the receptacle. Fixed to the carriage 106 to move therewith are a pair of spaced upstanding fingers 108 which extend upwardly through slots 109 extending the full length of the bottom wall of the receptacle. These fingers are adapted to engage the rear edge of the stack of sheets W' in the receptacle and slide the stack upwardly along the bottom of the receptacle and onto a continuously driven belt 110′ which takes the stack away to an operator who packages them, see Fig. 6.

Figures 6, 7:
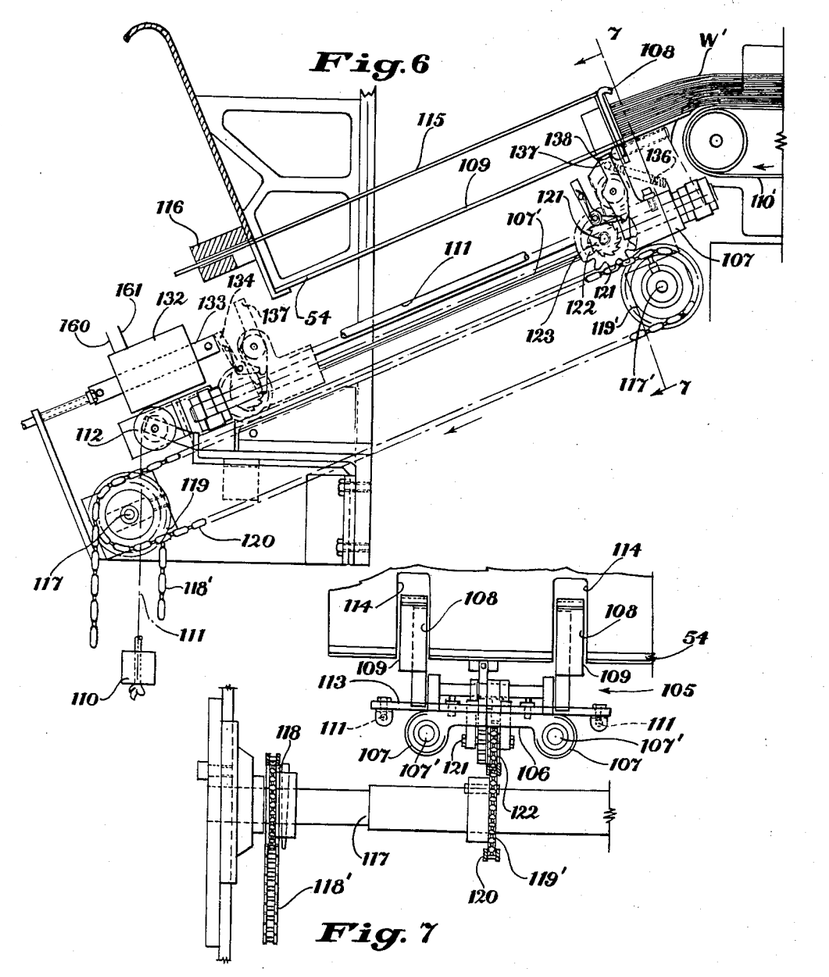
Fig. 6 is a side elevational view, partly in section, showing a preferred form of stack take-away mechanism.
Fig. 7 is an end elevational view taken substantially on line 7—7 of Fig. 6.
Figures 8, 9, 10:
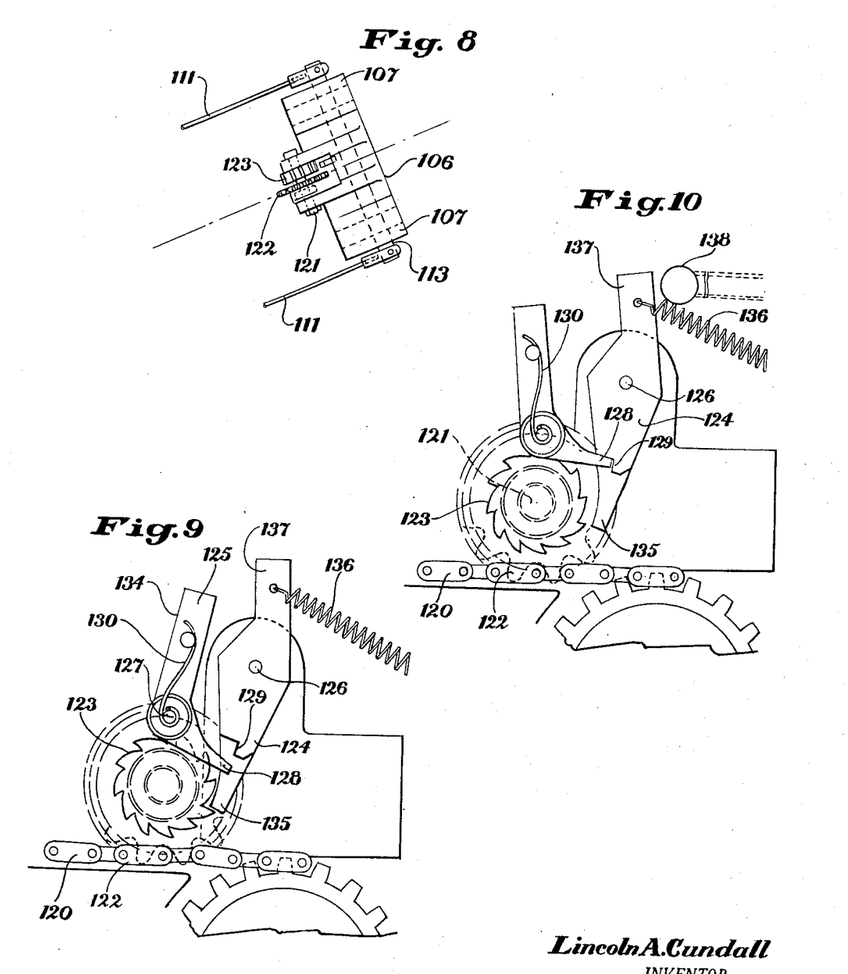
Fig. 8 is an elevational view showing the bottom of the slidable carriage forming a part of the take-away mechanism.
Fig. 9 is an enlarged detail view showing the pawl and ratchet mechanism constituting a part of the carriage driving means, and showing the pawl and ratchet in the position they assume when the carriage is drivingly connected to the drive chain.
Fig. 10 is a view similar to Fig. 9 but showing the pawl and ratchet in disengaged positions for disconnecting the driving sprocket from the driving chain, these parts assuming this position when the stack shifting carriage is moved to its operative position and the pawl has been disengaged from the ratchet upon being engaged by a stop at the end of the upper travel of the carriage.

The carriage 106 is normally moved to an inoperative position, see dotted line position in Fig. 6, by a pair of weights 110 connected to cords 111 passing over pulleys 112 fixed to the frame of the machine, said cords being connected at their other end to the opposite ends of a cross bar 113 bolted to, and extending transversely of, the carriage, see Figs. 6 and 7. The back wall 90 of the receptacle is provided with a pair of slots 114 through which the outstanding fingers 108 pass when the carriage is returned to its inoperative position. In the inoperative position of the carriage 106 the fingers 108 lie behind the back wall 90 of the receptacle and out of engagement with the stack of sheets, see Fig. 2. Fixed to the back side of each of the fingers 108 is a tail piece 115 which extends parallel to the bottom of the receptacle and have their free ends supported and slidably guided in guides 116 fixed to the back wall 90 of the receptacle. The purpose of these two tail pieces is to support those sheets which are deposited by the gripper mechanism during the time the carriage 106 and pusher fingers 108 thereon are in the process of taking away a counted stack of sheets or is returning to its inoperative position. Any and all sheets stacked on the tail pieces 115 while the carriage is out of its inoperative position will be held by the back wall as the carriage moves back to its inoperative position whereupon said sheets will then drop down to the bottom of the receptacle and in front of the fingers 108.

The means for moving the carriage from its inoperative position to its operative position and back again comprises a pair of spaced shafts 117 and 117′ extending transversely of the carriage 106 and journalled in the frame of the machine. The lower shaft 117 has a sprocket 18 fixed thereto adjacent one end which is connected by a chain 118′ to a sprocket on a drive motor, not shown, so that shaft 117 is continuously motor driven at all times. Each of the shafts 117 and 117′ have a sprocket 119 and 119′ fixed thereto adjacent their centers and directly below the carriage 106 and over which an endless chain 120 passes. This chain is continuously driven in the direction shown by the arrow in Fig. 6 and constitutes the prime motor for moving the carriage 106 up the guide rods 107′ to its stack take-away position.

Rotatably mounted on a shaft 121 carried by the carriage is a sprocket 122 which engages the chain 120 at all times. Fixed to this sprocket 122 is a ratchet 123 with which a pawl 124 and pawl lock 125 pivoted to the carriage at points 126 and 127, respectively, are arranged to cooperate, see Figs. 9 and 10. In the back or inoperative position of the carriage, shown in dotted lines in Fig. 6, the pawl 124 is locked clear of the ratchet 123 by the nose 128 of the pawl lock engaging a step 129 on the pawl, see Fig. 10. A spring 130 acting to move the pawl lock in a counterclockwise direction normally moves the pawl lock to this position when possible. With the pawl locked out of engagement with the ratchet 123, the sprocket 122 is free to rotate and the carriage remains in its back position or returns to such position under the action of weights 110.

When a prearranged number of sheets have accumulated in the receptacle 54, a solenoid 132 is energized and its plunger 133 moves outwardly to engage the end 134 of the pawl lock 125 and retract the nose 128 thereof from its locking position. When this happens, the nose 135 of pawl 124 moves into engagement with the ratchet due to the action of spring 136 and locks the sprocket 122 against rotation. When this occurs the sprocket 122 and carriage 106 are pulled up the incline by the chain 120 to deposit a stack of sheets on the take-away belt 110′. Just as the carriage reaches its stack depositing or upper position, see Fig. 6, an extension 137 on the pawl 124 comes into contact with an adjustable stop button 138 whereupon the nose of pawl 124 is moved out of engagement with the ratchet 123, see Fig. 10. This frees the sprocket 122 and allows it to rotate freely whereupon the upward movement of the carriage stops and it is returned to its lower inoperative position by the weights 110, the sprocket 122 rolling down the inclined reach of the chain 120 despite the fact that the chain is continuously moving upwardly. It goes without saying that the weights 110 and the cords 111 connected thereto could be replaced by return springs if desired.

Any one of the number of different known types of counting mechanisms might be used to energize the solenoid 132 after a given number of sheets have been stacked in the receptacle. By way of illustration I have shown in Fig. 1 such a counting mechanism as comprising a ratchet 140 adapted to be advanced a certain amount by a spring-pressed pawl 141 pivoted at point 57 on the arm 58 of lever 44 each time a sheet is chopped. A second spring-pressed pawl 142 engages the ratchet to prevent its being accidentally backed up as the pawl 142 is moved in a reset direction. Connected to the ratchet 140 is a pinion 143 engaging a gear 144 carrying a pin 145 which is adapted to close a switch 146 controlling a circuit for energizing the solenoid. This power circuit includes a source of potential shown as a battery B and the leads 160, 161 of this circuit are connected to the coil of the solenoid 132, as shown in Fig. 6. By properly selecting the gear ratio between pinion 143 and gear 144, the take-away mechanism can be made to operate after any desired number of sheets has been chopped and stacked in the receptacle 54.

Figure 12:
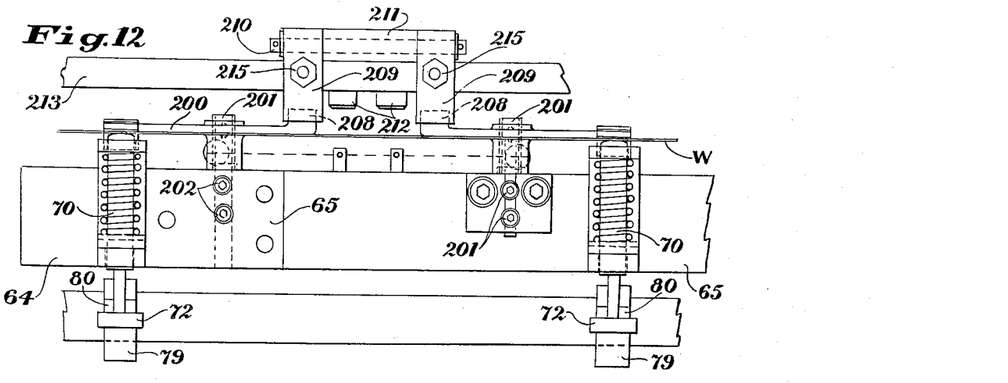
Fig. 12 is a top plan view showing another modification of releasable clamping jaws for the sheet-gripping mechanism which eliminates the need for knock-out arms.
Figure 13:
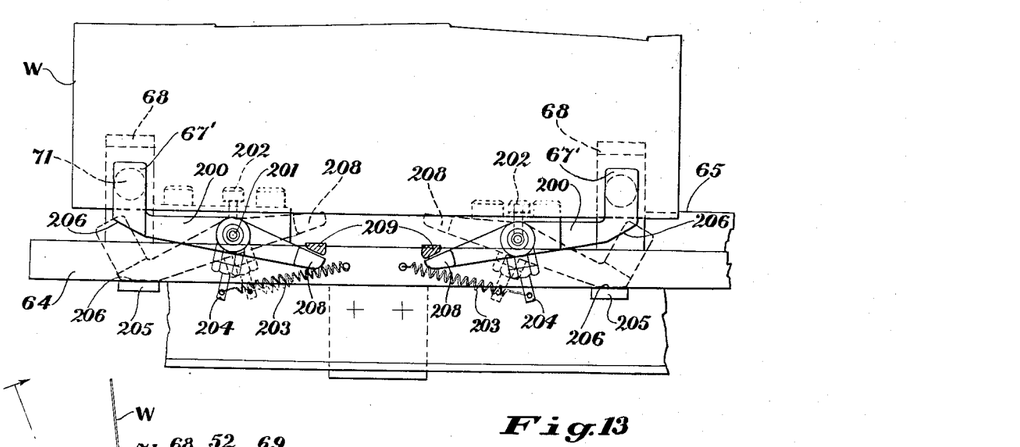
Fig. 13 is a view taken substantially on line 13—13 of Fig. 14 and showing the improved releasable sheet clamping jaws on the gripper member in sheet-engaging position in full lines and sheet-disengaging position in dotted lines.
Figure 14:
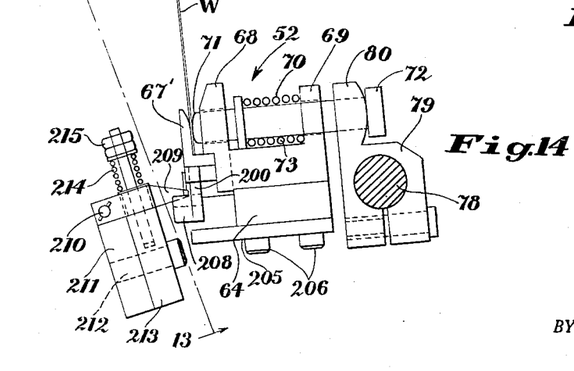
Fig. 14 is an end view of the improved sheet-clamping means shown in Figs. 12 and 13.

It has been found that with certain types of paper that the knock-out fingers 93 when striking the edge of the sheet to knock it from the jaws of the grippers 52 indent, or otherwise damage, the edge of the sheet so that it is not completely satisfactory for certain purposes where perfect edges on the sheet might be imperative. To overcome this difficulty, I have designed, and disclose in Figs. 12–14, another modification of a sheet gripper which completely releases the sheet when the gripper reaches its sheet-depositing position and thus eliminates the need for the knock-out fingers 93.

As in the first disclosed modification, the sheet grippers 52 have the same movement between a sheet-receiving position and a sheet-releasing position as described above, and they are moved between these two positions by the same mechanism as in the first modification. As before, the sheet grippers 52 are carried by blocks 65 fixed to the supporting bar 64 which extends parallel to the shaft 53. The grippers 52 in this instance, however, instead of including two fixed jaws 67 and 68 between which the end of the sheet W extends, includes only the fixed jaw 68 and upright 69 in bores of which is slidably mounted the plunger 70 which terminates at one end in the rubber tip 71 within jaw 68 and at the other end in an enlarged head 72. This plunger is normally moved to a sheet-gripping position by coil spring 73 and in which position the end of the sheet W is clamped between the jaw 67′ and the rubber tip 71 on the plunger, see Fig. 14. As in the first modification, there are two of these grippers for each sheet and they are spaced transversely of the sheet so as to engage the same close to the edges thereof. In this modification the jaw 67′, instead of being stationary, is movable between an operative position, shown in full lines in Fig. 13, and a sheet-releasing position, shown in dotted lines. The jaw 67′ of each gripper forms one end of a bell crank 200 pivoted on a pin 201 extending outwardly from block 65 and held in place in a bore of said block by a pair of set screws 202. The bell cranks are normally moved to an inoperative position where jaws 67′ are moved away from fixed jaws 68 and the sheet is released, see dotted line position, Fig. 13. Springs 203 having one end fixed to the bar 64 and their other end fixed to a pin 204 extending radially from the bearing portion of the bell crank perform this function. Stops 205 fixed to the bottom of bar 64 by bolts 207 are adapted to engage the bottom edge 206 of the jaw 67' to limit the extent to which the bell cranks can move under the action of springs 203.

When the grippers are moved to their sheet-receiving position, see full line position in Fig. 2, the jaws 67' must be moved to their operative position relative to stationary jaws 68 against the action of springs 203 in order to receive the end of the sheet W being fed through the chopping mechanism. This is accomplished when lugs 208 extending from the ends of the bell cranks 200 opposite jaws 67' engage their respective stop fingers 209 just as the grippers approach their sheet-receiving position. These stop fingers 209 are pivotally mounted on rod 210 carried on the top of block 211 fixed by bolts 212 to bar 213 extending across the machine substantially parallel to bar 64 and shaft 53. These stop fingers 209 are spring loaded by compression springs 214 and adjusting nuts 215 so that they can give slightly when struck by lugs 208 and thereby reduce any shock to which the parts, particularly lugs 208, might be subjected due to the slight over-travel required in the parts in order to operate the bell cranks.

After jaws 67' are moved into operative position and the end of the sheet W moves between them and jaws 68, the plungers 70 are released and moved to sheet-gripping position by springs 73 whereupon the rubber tips 71 of the plungers clamp the sheet against jaws 67'. The frictional force of tips 71 of plungers 70 is sufficient to hold the bell cranks 200 and jaws 67' thereon in sheet-engaging position against the action of springs 203 so that the sheet will be positively gripped by the grippers during the time it is swinging to its sheet-depositing position. At this time the cam 85 acting through actuating arms 79 for the plungers 70 will retract the plungers against their springs 73 as described in connection with the first embodiment of grippers. When plungers 70 are retracted, the springs 203 immediately swing the bell cranks 200 counterclockwise, looking at Fig. 13, and this moves jaws 67' out of engagement with the sheet W and the sheet is free to fall into receptacle 54. It will thus be seen that this form of sheet gripper completely releases its hold on the sheets without necessitating any knock-out fingers which might tend to damage the edge of the sheet. It is so effective that at speeds as high as the machine is capable of operating, the gripper will so effectively release the sheets that they will fall clear of the grippers before the same start to return to their sheet-receiving position.

Although I have shown and described certain specific embodiments of my invention, I am aware that many modifications thereof are possible. My invention, therefore, is not to be restricted to the specific embodiments shown and described but is intended to cover all embodiments coming within the scope of the appended claims.

Having thus described my invention, what I claim as new and desire to secure by Letters Patent of the United States is:

1. A sheet stacking mechanism for taking sheets from a point of deposit to which they are intermittently fed by an intermittently operated sheet-feeding means comprising a receptacle located below said point of deposit; a sheet gripper having releasable clamping jaws adapted to receive and clamp the lower edge of the sheet arriving at said point of deposit; means for oscillatably mounting said gripper to move between a sheet pickup position, wherein its jaws are in a position to receive the lower edge of the sheet arriving at said point of deposit, and a sheet depositing position, wherein it is moved to a point above and beyond said receptacle to drop an engaged sheet flatwise into the same, and including an oscillatable shaft carrying said gripper, a gear on said shaft, a rack engaging said gear and adapted to be reciprocated in synchronism with said sheet feeding means; means normally closing the jaws of said gripper; means for opening said jaws when the gripper reaches its sheet depositing position and keeping them open until the gripper returns to its sheet receiving position and receives the edge of a subsequent sheet, and including a linkage adapted to open said jaws; a continuously rotated cam rotated about the axis of said oscillatable shaft and adapted to engage and operate said linkage to open said jaws.

2. A sheet stacking mechanism according to claim 1 and including means for striking the edge of the sheet engaged by said jaws at the time said gripper reaches its sheet depositing position and after the jaws have been opened so as to knock the sheet out of said jaws for deposition into said receptacle.

3. A sheet stacking mechanism according to claim 1 and including means for knocking the sheet out of said jaws after they have been opened and the gripper is in its sheet depositing position, said means including a second oscillatable shaft parallel to said first-mentioned one; a knock-out finger fixed to said shaft to oscillate across the plane occupied by the gripped end of the sheet when the gripper is in its sheet depositing position and thereby engage the edge of the sheet with sufficient impact to knock it out of the gripper jaws; means for oscillating said second shaft in synchronism with oscillation of said gripper and including a pinion on said second shaft, a rack engaging said pinion, and a second continuously rotated cam coaxial with said first cam and said first oscillatable shaft for reciprocating said rack in synchronism with the gripper and the jaw opening linkage thereof.

4. A sheet stacking mechanism adapted to take sheets from a point of deposit to which they are intermittently fed by an intermittently operated sheet-feeding means and stack them in layer relationship comprising a receptacle located below said point of deposit; a sheet gripper having releasable clamping jaws adapted to receive and clamp the lower edge of a sheet located at said point of deposit, and including a pivoted jaw movable on said gripper to and from a sheet engaging position and normally moved from said position, a spring operated clamping jaw movable into and out of clamping relation with said pivoted jaw and adapted to frictionally retain said pivoted jaw in its sheet engaging position when moved into clamping relation therewith; means for oscillatably mounting said sheet gripper to move between a sheet pick-up position and a sheet-depositing position; means for moving said gripper between its two positions in synchronism with the sheet feeding means whereby it will be in its sheet pick-up position to receive the end of a sheet as it is advanced to the point of deposit; means for moving said pivoted jaw to its sheet engaging position by the time the gripper reaches its sheet pick-up position; means for releasing said spring operated jaw to move into sheet gripping relation with said pivoted jaw after the gripper has reached its sheet pick-up position and the end of the sheet is inserted between the two jaws; and means for retracting said spring operated jaw when the gripper reaches its sheet depositing position whereupon said pivoted jaw moves to its normal position out of engagement with said sheet and the sheet is free to fall into said receptacle.

5. A sheet stacking mechanism according to claim 4 characterized by the fact that the means for normally moving said pivoted jaw from its sheet engaging position comprising a spring normally acting thereon, the action of said spring being overcome by the frictional engagement between the spring operated jaw pressing a sheet against said pivoted jaw during the time the gripper is moving to its sheet depositing position.

6. A sheet stacking mechanism according to claim 4 characterized by the fact that the pivoted jaw is mounted on one arm of a bell crank pivoted on the sheet gripper, a spring fixed at one end to the gripper and at the other end to the bell crank normally acting to move the pivoted jaw from its sheet engaging position; a lug on the other arm of the bell crank; a stop pin located adjacent said deposit position against which said lug abuts as the gripper approaches its sheet receiving position whereby said bell crank is pivoted to move said pivoted jaw to its sheet engaging position against the action of said spring by the time the gripper reaches its sheet receiving position and at which time the spring operated jaw is released and holds said pivoted jaw in this position by gripping the sheet between the two jaws.

References Cited in the file of this patent

UNITED STATES PATENTS

| | | |
|---|---|---|
| 393,978 | Hawkins | Dec. 4, 1888 |
| 1,071,555 | Juengst | Aug. 26, 1913 |
| 1,412,225 | Winkley | Apr. 11, 1922 |
| 1,442,205 | Winkley | Jan. 16, 1923 |
| 1,569,032 | Reichel | Jan. 12, 1926 |
| 1,803,977 | Richter | May 5, 1931 |
| 1,916,965 | Cunningham | July 4, 1933 |
| 1,977,369 | Ackley | Oct. 16, 1934 |
| 2,206,661 | Carroll | July 2, 1940 |
| 2,517,675 | Keller | Aug. 8, 1950 |
| 2,540,971 | Wagner et al. | Feb. 6, 1951 |
| 2,549,560 | Archer | Apr. 17, 1951 |
| 2,682,344 | Preis et al. | June 29, 1954 |

FOREIGN PATENTS

| | | |
|---|---|---|
| 131,064 | Germany | May 19, 1901 |
| 610,886 | Great Britain | Oct. 21, 1948 |

U. S. DEPARTMENT OF COMMERCE
PATENT OFFICE

CERTIFICATE OF CORRECTION

Patent No. 2,831,684   Lincoln A. Cundall   April 22, 1958

It is hereby certified that error appears in the printed specification of the above numbered patent requiring correction and that the said Letters Patent should read as corrected below.

Column 2, line 24, for "oscillatory" read -- oscillatably --; line 60, for "itme" read -- time --; column 10, line 62, for "comprising" read -- comprises --.

Signed and sealed this 17th day of June 1958.

(SEAL)
Attest:
KARL H. AXLINE
Attesting Officer

ROBERT C. WATSON
Commissioner of Patents